(12) United States Patent
Kim et al.

(10) Patent No.: US 10,243,216 B2
(45) Date of Patent: Mar. 26, 2019

(54) ELECTROLYTIC COPPER FOIL FOR LITHIUM SECONDARY BATTERY AND LITHIUM SECONDARY BATTERY COMPRISING THE SAME

(71) Applicant: LS Mtron Ltd., Anyang-si, Gyeonggi-do (KR)

(72) Inventors: Seung-Min Kim, Osan-si (KR); Dae-Young Kim, Yongin-si (KR)

(73) Assignee: KCF TECHNOLOGIES CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/306,230

(22) PCT Filed: Jun. 7, 2016

(86) PCT No.: PCT/KR2016/006007
§ 371 (c)(1),
(2) Date: Oct. 24, 2016

(87) PCT Pub. No.: WO2017/018655
PCT Pub. Date: Feb. 2, 2017

(65) Prior Publication Data
US 2018/0123135 A1    May 3, 2018

(30) Foreign Application Priority Data

Jul. 24, 2015 (KR) .......................... 10-2015-0104779
May 24, 2016 (KR) .......................... 10-2016-0063598

(51) Int. Cl.
*C25D 1/04* (2006.01)
*H01M 4/62* (2006.01)
(Continued)

(52) U.S. Cl.
CPC .............. *H01M 4/628* (2013.01); *C25D 1/04* (2013.01); *C25D 3/38* (2013.01); *H01M 4/134* (2013.01);
(Continued)

(58) Field of Classification Search
None
See application file for complete search history.

(56) References Cited

U.S. PATENT DOCUMENTS 5,215,646 A     6/1993  Wolski et al.
9,287,566 B1 *  3/2016  Chou .................... H01M 4/661
(Continued)

FOREIGN PATENT DOCUMENTS

CN     1989793 A      6/2007
CN     203201283 U    9/2013
(Continued)

OTHER PUBLICATIONS

Chinese Office Action for related Chinese Application No. 201680000884.8; action dated Jul. 30, 2018; (5 pages).
(Continued)

*Primary Examiner* — Daniel J. Schleis
(74) *Attorney, Agent, or Firm* — K&L Gates LLP

(57) ABSTRACT

An electrolytic copper foil for a lithium secondary battery, wherein a curl indicator C of the electrolytic copper foil, which is defined as 1.21ΔR+1.12ΔCr+0.01ΔG, is 0 or above and 4.0 or below, where ΔR corresponds to an absolute value of a difference between roughness measured on a first surface of the electrolytic copper foil for a lithium secondary battery and roughness measured on a second surface thereof, ΔCr corresponds to an absolute value of a difference between a chrome-deposited amount of an anti-corrosion layer formed on the first surface of the electrolytic copper foil for a lithium secondary battery and a chrome-deposited
(Continued)

amount of an anti-corrosion layer formed on the second surface, and ΔG corresponds to an absolute value of a difference between glossiness measured on the first surface of the electrolytic copper foil for a lithium secondary battery and glossiness measured on the second surface.

13 Claims, 2 Drawing Sheets

(51) Int. Cl.
    *H01M 4/134*     (2010.01)
    *H01M 4/66*     (2006.01)
    *C25D 3/38*     (2006.01)
    *H01M 10/052*     (2010.01)

(52) U.S. Cl.
    CPC .............. *H01M 4/66* (2013.01); *H01M 4/661* (2013.01); *H01M 4/667* (2013.01); *H01M 10/052* (2013.01)

(56) References Cited

U.S. PATENT DOCUMENTS

| | | |
|---|---|---|
| 2004/0104118 A1 | 6/2004 | Kim et al. |
| 2010/0038115 A1 | 2/2010 | Matsuda et al. |
| 2014/0017564 A1 | 1/2014 | Suzuki et al. |
| 2014/0193660 A1 | 7/2014 | Tsai et al. |
| 2014/0199588 A1 | 7/2014 | Shinozaki et al. |
| 2014/0342178 A1 | 11/2014 | Saito |

FOREIGN PATENT DOCUMENTS

| | | |
|---|---|---|
| CN | 104427758 A | 3/2015 |
| CN | 104754860 A | 7/2015 |
| EP | 0 778 361 A2 | 6/1997 |
| JP | 2009068042 A | 4/2009 |
| KR | 10-2007-0107803 A | 11/2007 |
| KR | 10-2013-0102849 A | 9/2013 |
| KR | 10-2014-0003511 A | 1/2014 |
| KR | 10-2014-0041804 A | 4/2014 |
| KR | 10-2014-0090069 A | 7/2014 |
| KR | 101449342 B1 | 10/2014 |
| WO | WO 2013/002273 A1 | 1/2013 |
| WO | WO 2013/136729 A1 | 9/2013 |

OTHER PUBLICATIONS

Extended European Search Report dated Jan. 23, 2019 for related European Application No. 16830688.4; (13 Pages).

* cited by examiner

ELECTROLYTIC COPPER FOIL FOR LITHIUM SECONDARY BATTERY AND LITHIUM SECONDARY BATTERY COMPRISING THE SAME

TECHNICAL FIELD

The present disclosure relates to an electrolytic copper foil for a lithium secondary battery and a lithium secondary battery comprising the same, and more particularly, to an electrolytic copper foil for a lithium secondary battery and a lithium secondary battery comprising the same, which may minimize generation of curls by limiting a curl indicator, in which main factors curling a copper foil are used as variables, into a predetermined range. The present application claims priority to Korean Patent Application No. 10-2015-0104779 filed on Jul. 24, 2015 and Korean Patent Application No. 10-2016-0063598 filed on May 24, 2016 in the Republic of Korea, the disclosures of which are incorporated herein by reference.

BACKGROUND ART

If a curl of a certain level or above is generated at an electrolytic copper foil for a lithium secondary battery, a wrinkle may be generated during a battery manufacturing process. If a wrinkle is seriously generated, the electrolytic copper foil may be overlapped. If the electrolytic copper foil is wrinkled or overlapped as described above, a serious defect may occur when manufacturing an electrolytic copper foil for a lithium secondary battery.

Accordingly, when manufacturing an electrolytic copper foil for a lithium secondary battery, it is generally required to control a curl in a level of about 7 mm or below.

Meanwhile, such a curl is generated due to a difference in stress and surface characteristics between both surfaces of a copper foil, namely a shiny surface having relatively higher glossiness and a matte surface having relatively lower glossiness.

For example, due to such a difference in stress and surface characteristics, if a compressive stress is applied to the matte surface, an M-side curl is generated, and if a compressive stress is applied to the shiny surface on the contrary, an S-side curl is generated.

Therefore, in order to control a curl generated at the copper foil to a certain level or below, it is required to find factors giving especially great influences on a curl of the copper foil from surface characteristics of both surfaces of the copper foil, and then control these factors within a certain range.

DISCLOSURE

Technical Problem

The present disclosure is designed to solve the problems of the related art, and therefore the present disclosure is directed to providing an electrolytic copper foil for a lithium secondary battery and a lithium secondary battery comprising the same, which may minimize generation of curls by finding factors giving especially great influences on curl characteristics of the electrolytic copper foil for a lithium secondary battery, and then controlling these factors within a certain range.

However, the technical objects to be accomplished by the present disclosure are not limited to the above, and other objects not mentioned above may be clearly understood from the following detailed description.

Technical Solution

After the researches to accomplish the above object, the inventors of the present disclosure have found that some factors give great influence on curl characteristics of an electrolytic copper foil for a lithium secondary battery, and also found that a curl change amount of the electrolytic copper foil for a lithium secondary battery may be controlled to a desired level by limiting a curl indicator, which uses such some factors as variables, within a predetermined range.

The electrolytic copper foil for a lithium secondary battery according to an embodiment of the present disclosure is characterized in that a curl indicator C of the electrolytic copper foil, which is defined as $1.21\Delta R+1.12\Delta Cr+0.01\Delta G$, is 0 or above and 4.0 or below, wherein the $\Delta R$ corresponds to an absolute value of a difference between roughness measured on a first surface of the electrolytic copper foil for a lithium secondary battery and roughness measured on a second surface thereof, wherein the $\Delta Cr$ corresponds to an absolute value of a difference between a chrome-deposited amount of a chrome layer formed on the first surface of the electrolytic copper foil for a lithium secondary battery and a chrome-deposited amount of a chrome layer formed on the second surface, and wherein the $\Delta G$ corresponds to an absolute value of a difference between glossiness measured on the first surface of the electrolytic copper foil for a lithium secondary battery and glossiness measured on the second surface.

Surface roughness measured at both surfaces of the copper foil for a lithium secondary battery may be respectively 0.2 μm to 2.5 μm.

The chrome-deposited amount of the chrome layer formed on both surfaces of the copper foil for a lithium secondary battery may be respectively 1.0 mg/m² or above.

The glossiness measured at both surfaces of the copper foil for a lithium secondary battery may be respectively 10 GU to 450 GU.

The $\Delta R$ may be 0 or above and 2.0 μm or below.
The $\Delta Cr$ may be 0 or above and 3.5 mg/m² or below.
The $\Delta G$ may be 0 or above and 350 GU or below.

The electrolytic copper foil for a lithium secondary battery may have a thickness of 4 μm to 35 μm.

Meanwhile, a lithium secondary battery according to an embodiment of the present disclosure is manufactured by applying the electrolytic copper foil for a lithium secondary battery, described above, as a negative electrode current collector.

Advantageous Effects

According to an embodiment of the present disclosure, while an electrolytic copper foil for a lithium secondary battery is being manufactured, a curl amount generated at the copper foil may be controlled to a standard level or below, and by doing so, it is possible to prevent the copper foil from being wrinkled or overlapped while a lithium secondary battery is being manufactured.

BRIEF DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an electrolytic copper foil for a lithium secondary battery according to an embodiment of the present disclosure will be described with reference to FIGS. 1 and 2.

Figure 1:
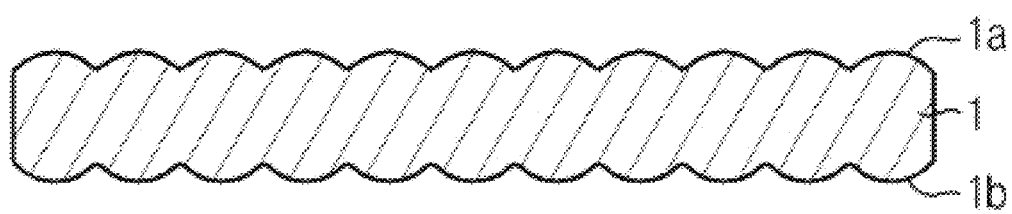
FIG. 1 is a cross-sectional view showing an electrolytic copper foil for a lithium secondary battery according to an embodiment of the present disclosure.
Figure 2:
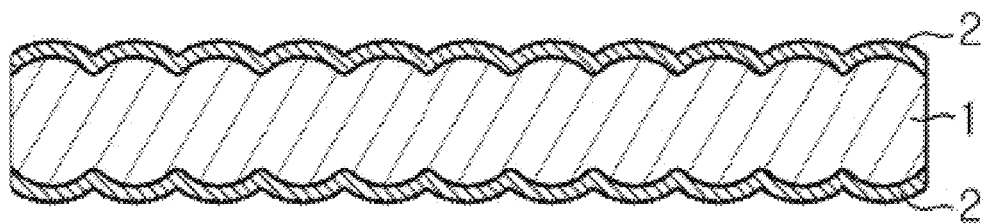
FIG. 2 is a cross-sectional view showing an anti-corrosion layer formed at both surfaces of the electrolytic copper foil for a lithium secondary battery according to an embodiment of the present disclosure.

FIG. 1 is a cross-sectional view showing an electrolytic copper foil for a lithium secondary battery according to an embodiment of the present disclosure, and FIG. 2 is a cross-sectional view showing that an anti-corrosion layer is formed at both surfaces of the electrolytic copper foil for a lithium secondary battery according to an embodiment of the present disclosure.

The electrolytic copper foil 1 for a lithium secondary battery according to an embodiment of the present disclosure, shown in FIGS. 1 and 2, has a thickness of about 4 μm to 35 μm and may be used as a negative electrode current collector of a lithium secondary battery. In other words, in the lithium secondary battery, the negative electrode current collector coupled to a negative electrode active material may employ the electrolytic copper foil.

Meanwhile, when manufacturing a lithium secondary battery, a positive electrode current collector coupled to a positive electrode active material generally employs a foil made of aluminum (Al).

Accordingly, the present disclosure is based on a case where the electrolytic copper foil 1 for a lithium secondary battery corresponds to a negative electrode current collector applied to the lithium secondary battery.

A stress applied to the electrolytic copper foil 1 for a lithium secondary battery is determined by a surface shape, glossiness and a chrome-deposited amount of the copper foil. The surface shape and the glossiness have close relations with a crystal structure and a grain size of the copper foil.

If a crystal of forming the electrolytic copper foil has a circular structure with a small grain size, the surface of the electrolytic copper foil 1 for a lithium secondary battery has low roughness and high glossiness. On the contrary, if a crystal of the electrolytic copper foil has a pillar structure with a great grain size, the surface of the electrolytic copper foil has high roughness and low glossiness.

Generally, if a compressive stress is put to one, which has low roughness and high glossiness, of both surfaces of the electrolytic copper foil 1 for a lithium secondary battery, a curl is generated at the surface to which the compressive stress is put.

In addition, a curl is also generated at the electrolytic copper foil 1 for a lithium secondary battery due to a difference in chrome-deposited amounts of anti-corrosion layers 2 formed on both surfaces thereof. In other words, if a compressive stress is put to one, which has a greater chrome-deposited amount, of both surfaces of the electrolytic copper foil 1 for a lithium secondary battery, a curl is generated at the surface to which the compressive stress is put.

Therefore, in order to restrict an occurrence of curl at the electrolytic copper foil 1 for a lithium secondary battery, not only surface roughness and glossiness having a relation with a grain size and a crystal structure of the electrolytic copper foil 1 for a lithium secondary battery, but also a chrome-deposited amount of the anti-corrosion layer 2 formed on both surfaces of the copper foil should be controlled.

In the present disclosure, the degree of a curl is represented by a curl indicator C which corresponds to an index representing the degree of curl generated at the copper foil.

Here, the curl indicator C is an function which defines a difference in surface roughness, measured at both surfaces of the electrolytic copper foil 1 for a lithium secondary battery, a difference in chrome (Cr) deposited amount of the anti-corrosion layers 2 formed on both surfaces of the electrolytic copper foil 1 for a lithium secondary battery, and a difference in glossiness measured at both surfaces of the electrolytic copper foil 1 for a lithium secondary battery, as variables.

The curl indicator C is defined as follows:

$C=1.21\Delta R+1.12\Delta Cr+0.01\Delta G$ (where $\Delta R$ corresponds to an absolute value of a difference in surface roughness measured at a first surface $1a$ and a second surface $1b$, $\Delta Cr$ corresponds to an absolute value of a difference in chrome-deposited amount of the anti-corrosion layers 2 respectively formed at the first surface $1a$ and the second surface $1b$, and $\Delta G$ corresponds to an absolute value of a difference in glossiness measured at the first surface $1a$ and the second surface $1b$).

In the electrolytic copper foil 1 for a lithium secondary battery according to an embodiment of the present disclosure, in order to minimize generation of a curl, the curl indicator C representing a curl characteristic is limited to 0 or above and 4.0 or below.

If the curl indicator C is greater than 4.0, a curl is generated greater than a level, which is required to use the copper foil as a negative electrode current collector of a secondary battery, and thus it is difficult to apply the copper foil as a negative electrode current collector of a lithium secondary battery.

Three parameters of the curl indicator C have different units. However, after the difference in surface roughness ($\Delta R$) is calculated in the unit of μm, the difference in chrome-deposited amount ($\Delta Cr$) is calculated in the unit of mg/m$^2$, and the difference in glossiness ($\Delta G$) is calculated in the unit of GU (Glossy Unit), these values are summed regardless of their units, thereby obtaining the curl indicator C.

Meanwhile, in the electrolytic copper foil 1 for a lithium secondary battery, in order to obtain a desired curl characteristic, the curl indicator C may be limited to a predetermined range, and desirably, each parameter (ΔR, ΔCr, and ΔG) of the curl indicator C may also be limited to a predetermined range.

First, in the electrolytic copper foil 1 for a lithium secondary battery, ΔR which is an absolute value of a difference in surface roughness measured on both surfaces (the first surface and the second surface) may be 0 μm or above and 2.0 μm or below. If ΔR is greater than 2.0 μm, a curl exceeding a reference level may be generated at one, which has lower roughness, of both surfaces of the copper foil, and this copper foil may be commercially unavailable.

Next, in the electrolytic copper foil 1 for a lithium secondary battery, ΔCr which is an absolute value of a difference in chrome-deposited amount of the anti-corrosion layers 2 formed on both surfaces (the first surface and the second surface) may be 0 mg/m$^2$ or above and 3.5 mg/m$^2$ or below. If ΔCr is greater than 3.5 mg/m$^2$, a curl exceeding a reference level may be generated at one, which has a greater deposited amount, of both surfaces of the copper foil, and this copper foil may be commercially unavailable.

Finally, in the electrolytic copper foil 1 for a lithium secondary battery, ΔG which is an absolute value of a difference in glossiness measured on both surfaces (the first surface and the second surface) may be 0 GU or above and 350 GU or below. If ΔG is greater than 350 GU, a curl exceeding a reference level may be generated at one, which has higher glossiness, of both surfaces of the copper foil, and this copper foil may be commercially unavailable.

Meanwhile, roughness (namely, roughness of both surfaces) respectively measured at the first and second surfaces of the electrolytic copper foil 1 for a lithium secondary battery may be about 0.2 μm to 2.5 μm, on the basis of Rz (ten-point average roughness).

If the roughness of both surfaces is less than about 0.2 μm, the adhesion between the electrolytic copper foil and the active material may deteriorate. If the adhesion between the electrolytic copper foil and the active material deteriorates as above, the active material is more likely to be separated from the electrolytic copper foil while the lithium secondary battery is in use.

If the roughness of both surfaces is greater than about 2.5 μm, the active material may not be uniformly coated on a surface of the electrolytic copper foil due to high roughness, thereby deteriorating an adhesion force. If the active material is not uniformly coated as above, a discharge capacity retention rate of the lithium secondary battery may be deteriorated In addition, in the electrolytic copper foil 1 for a lithium secondary battery according to an embodiment of the present disclosure, the glossiness respectively measured at the first surface and the second surface (namely, the glossiness of both surfaces) may be about 10 GU or above and 450 GU or below.

If the glossiness of both surfaces is smaller than 10 GU or greater than 450 GU, during a battery manufacturing process, an error may be generated when sensing the copper foil during a process of coating pattern of a negative electrode active material on both surfaces of the electrolytic copper foil.

In addition, in the electrolytic copper foil for a lithium secondary battery according to an embodiment of the present disclosure, the Cr-deposited amount of the anti-corrosion layer 2 plated on the first surface and the second surface may be 1.0 mg/m$^2$ or above and 4.5 mg/m$^2$ or below.

If the Cr-deposited amount of both surfaces is smaller than 1.0 mg/m$^2$, the electrolytic copper foil may be easily oxidized due to the air and thus unavailable as a copper foil for a secondary battery. If the Cr-deposited amount of both surfaces is greater than 4.5 mg/m$^2$, an adhesion force between the electrolytic copper foil and the negative electrode active material is lowered.

Examples and Comparative Examples

Hereinafter, after preparing electrolytic copper foils according to examples satisfying features of the present disclosure as well as comparative examples, properties between the examples and the comparative examples are compared so that features of the present disclosure is the more clearly.

An electrolytic copper foil for a lithium secondary battery according to each of the examples and the comparative examples is prepared using an apparatus for electrolytic deposition which includes a rotating drum and a positive electrode plate located at a predetermined interval from the drum, in an electrolytic bath.

The electrolytic copper foil according to an example of the present disclosure may be manufactured by preparing an electrolyte by adding an additive composed of 2 to 16 mg/L of gelatin and 2 to 16 mg/L of HEC into copper sulphate containing 50 to 100 g/L of copper and 50 to 150 g/L of sulfuric acid, and then applying a current with a current density of about 10 ASD to 80 ASD to the electrolyte so that a copper foil is electrodeposited on the drum of the electrolytic deposition apparatus.

In addition, a gradient may be given to the applied current so that a current density at initial plating is different from a current density at final plating, which may minimize a difference in glossiness and roughness between both surfaces of the copper foil. In other words, the current density at initial plating may be about 1.5 times or above higher than the current density at final plating. Here, the current density at initial plating means a current density applied within 2 to 5 seconds during which a nucleus of the copper plating is generated in electrolytic process, and the current density at final plating means a current density during a period time other than the initial plating. In addition, the current density is suddenly and discontinuously controlled so that the current density at initial plating may be about 1.5 times higher than the current density at final plating. In other words, a current is controlled to have the current density at initial plating, and if the time for final plating comes, the current is controlled so that the current density suddenly and discontinuously drops, and consequently the current density at initial plating may be about 1.5 times or above higher than the current density at final plating.

Moreover, the pretreatment electrolytic copper foil (namely, the original foil) prepared through the electrolytic process is immersed in an anti-corrosion solution having a Cr concentration of 0.5 to 1.5 g/L and an additive (for example, 2-dioxyribose or the like) concentration of 1.2 g/L at a liquid temperature of 20° C. to 35° C. for 0.5 to 2 seconds so that both surfaces of the pretreatment electrolytic copper foil are coated with a chrome anti-corrosion solution, thereby forming the anti-corrosion layers 2 of FIG. 2. At this time, a difference in chrome-deposited amount of the anti-corrosion layers 2 may be minimized by suitably adjusting the Cr concentration and the additive (for example, 2-dioxyribose or the like) concentration, and/or surface roughness and shapes of both surfaces of the original foil.

Meanwhile, in the electrolytic copper foil according to a comparative example, the copper sulphate containing 50 to 100 g/L of copper and 50 to 150 g/L of sulfuric acid contains additives, namely gelatin and HEC with concentrations as in Table 1 below, different from the example. Also, a current applied to the electrolyte has a current density in the range of 10 ASD to 80 ASD, but the current is controlled so that a difference between the current density at initial plating and the current density at final plating is less than 1.5 times, and then the copper foil is electrodeposited on the drum of the electrolytic deposition apparatus.

Moreover, the pretreatment electrolytic copper foil (namely, the original foil) of the comparative example prepared through electrolytic process is immersed in an anti-corrosion solution as in Table 1 below so that both surfaces of the pretreatment electrolytic copper foil are coated with a chrome anti-corrosion solution, thereby forming anti-corrosion layers.

Detailed electrolyte composition, electrolysis conditions and anti-corrosion layer forming conditions to prepare the electrolytic copper foils according to the examples and the comparative examples are as follows.

(1) Electrolyte Composition and Electrolysis Conditions
Copper: 75 g/L
Sulfuric acid: 100 g/L
Temperature of electrolyte: 55° C.
Current density at initial plating and current density at final plating: see Table 1 below Concentration of additives (gelatin and HEC): see Table 1 below (2) Conditions for Forming an Anti-Corrosion Layer
Cr concentration in an anti-corrosion solution: 1.0 g/L
Concentration of additives (2-dioxyribose) in an anti-corrosion solution: see Table 1 below
Liquid temperature: 20° C. to 35° C.
Immersion time: 0.5 second to 2 seconds

TABLE 1

|  | additive (gelatin) [mg/L] | additive (HEC) [mg/L] | current density at initial plating [ASD] | current density at final plating [ASD] | Cr [g/L] | 2-dioxyribose [g/L] |
| --- | --- | --- | --- | --- | --- | --- |
| Example 1 | 2.1 | 2.3 | 75 | 40 | 1.0 | 1.2 |
| Example 2 | 2.2 | 15.9 | 75 | 40 | 1.0 | 1.2 |
| Example 3 | 7.5 | 2.2 | 65 | 40 | 1.0 | 1.2 |
| Example 4 | 7.8 | 15.8 | 65 | 40 | 1.0 | 1.2 |
| Example 5 | 15.8 | 2.3 | 80 | 40 | 1.0 | 1.2 |
| Example 6 | 15.8 | 15.8 | 80 | 40 | 1.0 | 1.2 |
| Example 7 | 3.7 | 4.9 | 70 | 40 | 1.0 | 1.2 |
| Comparative Example 1 | 1.9 | 7.6 | 75 | 40 | 1.0 | 1.2 |
| Comparative Example 2 | 16.5 | 7.4 | 75 | 40 | 1.0 | 1.2 |
| Comparative Example 3 | 7.5 | 1.8 | 80 | 40 | 1.0 | 1.2 |
| Comparative Example 4 | 7.4 | 16.8 | 80 | 40 | 1.0 | 1.2 |
| Comparative Example 5 | 7.5 | 7.6 | 55 | 40 | 1.0 | 1.2 |
| Comparative Example 6 | 7.5 | 7.6 | 45 | 40 | 1.0 | 1.2 |
| Comparative Example 7 | 2.1 | 2.3 | 65 | 40 | 1.0 | 0 |
| Comparative Example 8 | 2.1 | 2.3 | 80 | 40 | 1.0 | 0 |

Next, the degree of generated curl according to a curl indicator C of the electrolytic copper foil according to the above examples and the above comparative examples will be investigated with reference to Table 2 below.

Measurement of Surface Roughness
In order to measure surface roughness of the electrolytic copper foil, a surface roughness measurer (SE1700 produced by Kosaka Laboratory Ltd.) was used.

Analysis of Chrome-Deposited Amount
The chrome-deposited amount was measured by dissolving electrolytic copper foil samples according to the examples and the comparative examples with nitric acid with a concentration of 20 mass %, and then conducting a quantitative analysis thereto by means of atomic absorption spectrophotometry using an atomic absorption spectrophotometer (type: AA240FS) produced by VARIAN.

Measurement of Glossiness
Glossiness was measured with an incident angle of 60 degrees, by using a handy glassmeter PG 1, produced by Nippon Denshoku Industries, according to JIS Z8741.

Figure 3:
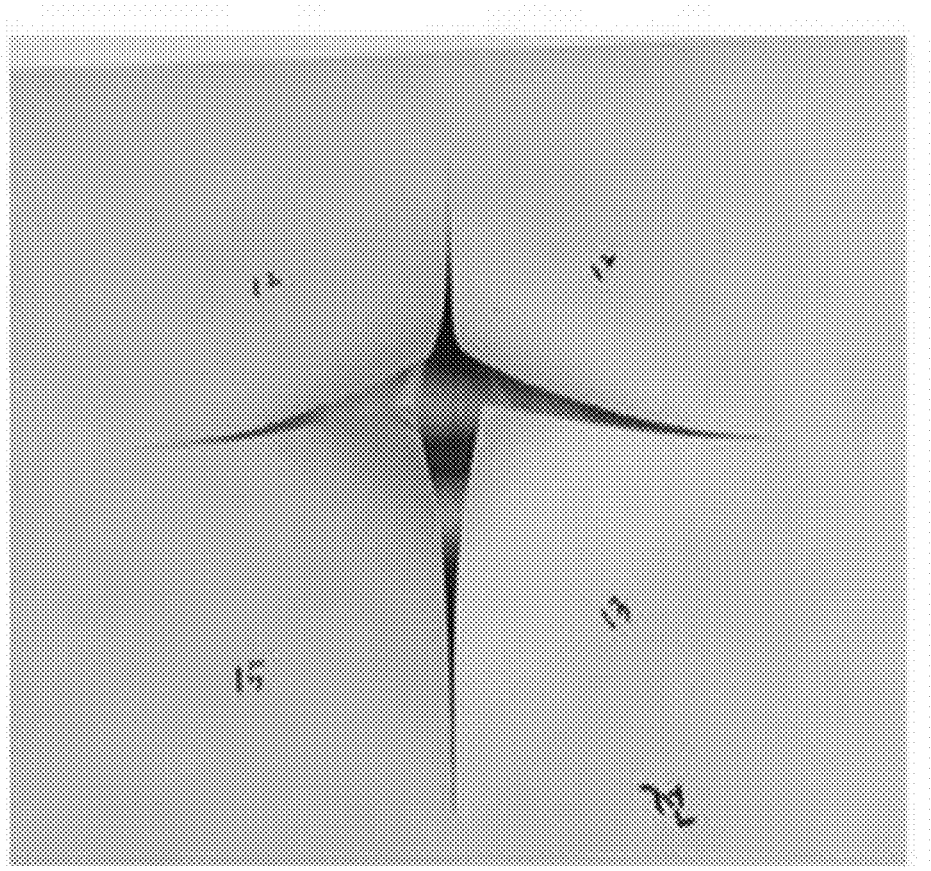
FIGS. 3 and 4 are photographs for illustrating a method for measuring a curl of an electrolytic copper foil for a lithium secondary battery according to an embodiment of the present disclosure.
Figure 4:
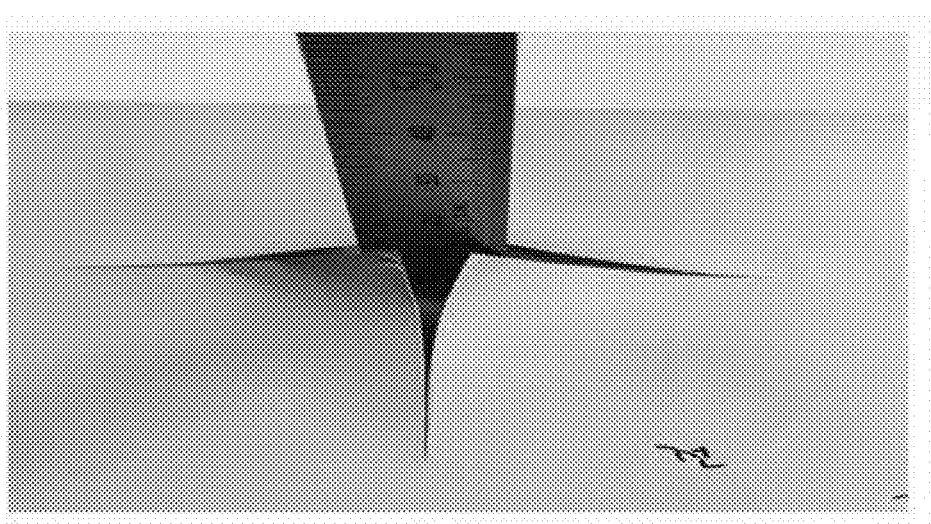

Curl Measuring Method
As shown in the photograph of FIG. 3, a matte surface, which has relatively lower glossiness between both surfaces of the electrolytic copper foil according to each of the examples and the comparative examples, was cut into a cross shape with a size of 8 cm×8 cm, and then as shown in the photograph of FIG. 4, heights of four portions rising sharply due to the generation of curl were measured using a ruler. At this time, an arithmetic mean of the measurement values corresponds to a curl value of the corresponding copper foil.

TABLE 2

| | thickness [μm] | first surface Rz [μm] | second surface Rz [μm] | ΔR [μm] | first surface glossiness [G·U] | second surface glossiness [G·U] | ΔG [G·U] | Cr amount of first surface [mg/mm$^2$] | Cr amount of second surface [mg/mm$^2$] | ΔCr [mg/mm$^2$] | curl indicator [C] | curl [mm] |
|---|---|---|---|---|---|---|---|---|---|---|---|---|
| Example 1 | 6 | 2.44 | 0.85 | 1.59 | 45 | 80 | 35 | 2.1 | 1.9 | 0.2 | 2.50 | 2.3 |
| Example 2 | 6 | 2.45 | 0.85 | 1.60 | 122 | 85 | 37 | 2.1 | 1.9 | 0.2 | 2.53 | 6.4 |
| Example 3 | 6 | 1.76 | 0.85 | 0.91 | 88 | 42 | 46 | 2.1 | 1.9 | 0.2 | 1.79 | 6.8 |
| Example 4 | 6 | 1.21 | 0.85 | 0.36 | 211 | 121 | 90 | 2.1 | 1.3 | 0.8 | 2.23 | 6.4 |
| Example 5 | 6 | 1.32 | 0.88 | 0.44 | 177 | 86 | 91 | 2 | 2.5 | 0.5 | 2.00 | 4.2 |
| Example 6 | 6 | 0.65 | 0.88 | 0.23 | 362 | 83 | 279 | 2 | 2.7 | 0.7 | 3.85 | 5.8 |
| Example 7 | 6 | 2.01 | 0.78 | 1.23 | 88 | 87 | 1 | 2 | 2.9 | 0.9 | 2.51 | 6.5 |
| Comparative Example 1 | 6 | 2.92 | 0.85 | 2.07 | 32 | 87 | 55 | 2.8 | 1.9 | 0.9 | 4.06 | 7.5 |
| Comparative Example 2 | 6 | 1.21 | 0.85 | 0.36 | 425 | 73 | 352 | 2.1 | 1.9 | 0.9 | 4.18 | 7.9 |
| Comparative Example 3 | 6 | 2.89 | 0.85 | 2.04 | 18 | 82 | 64 | 2.9 | 1.9 | 1.0 | 4.23 | 8.2 |
| Comparative Example 4 | 6 | 0.67 | 0.85 | 0.18 | 467 | 82 | 385 | 1.9 | 2.1 | 0.2 | 4.29 | 8.3 |
| Comparative Example 5 | 6 | 2.88 | 0.67 | 2.21 | 18 | 82 | 64 | 2.9 | 2.1 | 0.8 | 4.21 | 8.1 |
| Comparative Example 6 | 6 | 3.02 | 0.67 | 2.35 | 11 | 82 | 71 | 2.8 | 2.1 | 0.7 | 4.34 | 8.3 |
| Comparative Example 7 | 6 | 2.12 | 0.88 | 1.24 | 89 | 86 | 3 | 4.1 | 0.5 | 3.6 | 5.56 | 7.9 |
| Comparative Example 8 | 6 | 1.45 | 0.88 | 0.57 | 268 | 86 | 182 | 2.2 | 0.7 | 1.5 | 4.19 | 7.9 |

Seeing Table 2 above, if the copper foil has a curl indicator C of 4 or below (Examples 1 to 7), the amount of generated curl is 7 mm or below, which does not exceeds the criterion value. However, if the curl indicator C is greater than 4 (Comparative Examples 1 to 8), it may be found that the amount of generated curl is greater than 7 mm.

In Examples 1 to 7, it may be found that the copper foil has a curl indicator C of 4 or below, and also each parameter (ΔR, ΔCr and ΔG) of the curl indicator C expressed as C=1.21ΔR+1.12ΔCr+0.01ΔG (here, ΔR corresponds to an absolute value of a difference in surface roughness measured at the first surface 1a and the second surface 1b, ΔCr corresponds to an absolute value of a difference in chrome-deposited amount of the anti-corrosion layers 2 respectively formed at the first surface 1a and the second surface 1b, and ΔG corresponds to an absolute value of a difference in glossiness measured at the first surface 1a and the second surface 1b) does not also deviate from a desirable range.

In other words, in Examples 1 to 7, it may be found that ΔR is 2.0 μm or below, ΔCr is 3.5 mg/m$^2$ or below, and ΔG is 350 GU or below.

Meanwhile, in Comparative Examples 1 to 7, it may be found that the copper foil has a curl indicator C greater than 4, and each parameter (ΔR, ΔCr and ΔG) of the curl indicator C also deviates from a desirable range. In particular, in Comparative Example 8, even though the parameters ΔR, ΔCr and ΔG of the curl indicator C satisfy the numerical ranges defined in the present disclosure, the curl indicator C is greater than 4, and thus the amount of generated curl exceeds 7 mm.

As described above, the copper foil for a lithium secondary battery according to an embodiment of the present disclosure may minimize the generation of curl by controlling a curl indicator, and also controlling each the parameters ΔR, ΔCr and ΔG of the curl indicator within a predetermined range.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure provides an electrolytic copper foil for a lithium secondary battery, which is used for a negative electrode current collector applied to a lithium secondary battery, and a lithium secondary battery comprising the same.

What is claimed is:

1. An electrolytic copper foil for a lithium secondary battery,
wherein a curl indicator C of the electrolytic copper foil, which is defined as 1.21ΔR+1.12ΔCr+0.01ΔG, is 0 or above and 4.0 or below,
wherein the ΔR corresponds to an absolute value of a difference between roughness (Rz) (μm) of a first surface of the electrolytic copper foil for a lithium secondary battery and roughness (Rz) (μm) of a second surface thereof,
wherein the ΔCr corresponds to an absolute value of a difference between a chrome-deposited amount (mg/m$^2$) of an anti-corrosion layer formed on the first surface of the electrolytic copper foil for a lithium secondary battery and a chrome-deposited amount (mg/m$^2$) of an anti-corrosion layer formed on the second surface, and
wherein the ΔG corresponds to an absolute value of a difference between glossiness (GU) of the first surface of the electrolytic copper foil for a lithium secondary battery and glossiness (GU) of the second surface, the glossinesses of the first and second surfaces measured with an incident angle of 60 degrees.

2. The electrolytic copper foil for a lithium secondary battery according to claim 1, wherein surface roughness measured at the first surface and the second surface of the electrolytic copper foil for a lithium secondary battery is respectively 0.2 μm to 2.5 μm.

3. The electrolytic copper foil for a lithium secondary battery according to claim 1,
wherein the chrome-deposited amount of the anti-corrosion layer formed on the first surface and the second surface of the electrolytic copper foil for a lithium secondary battery is respectively 1.0 mg/m$^2$ or above and 4.5 mg/m$^2$ or below.

4. The electrolytic copper foil for a lithium secondary battery according to claim 1,
wherein the glossiness measured at the first surface and the second surface of the electrolytic copper foil for a lithium secondary battery is respectively 10 GU to 450 GU.

5. The electrolytic copper foil for a lithium secondary battery according to claim 1,
wherein the ΔR is 0 μm or above and 2.0 μm or below.

6. The electrolytic copper foil for a lithium secondary battery according to claim 1,
wherein the ΔCr is 0 mg/m$^2$ or above and 3.5 mg/m$^2$ or below.

7. The electrolytic copper foil for a lithium secondary battery according to claim 1,
wherein the ΔG is 0 GU or above and 350 GU or below.

8. The electrolytic copper foil for a lithium secondary battery according to claim 5,
wherein the ΔG is 0 GU or above and 350 GU or below.

9. The electrolytic copper foil for a lithium secondary battery according to claim 8,
wherein the ΔCr is 0 mg/m$^2$ or above and 3.5 mg/m$^2$ or below.

10. The electrolytic copper foil for a lithium secondary battery according to claim 5,
wherein the ΔCr is 0 mg/m$^2$ or above and 3.5 mg/m$^2$ or below.

11. The electrolytic copper foil for a lithium secondary battery according to claim 7,
wherein the ΔCr is 0 mg/m$^2$ or above and 3.5 mg/m$^2$ or below.

12. The electrolytic copper foil for a lithium secondary battery according to claim 1,
wherein the electrolytic copper foil for a lithium secondary battery has a thickness of 4 μm to 35 μm.

13. A lithium secondary battery, to which the electrolytic copper foil for a lithium secondary battery according to claim 1 is applied as a negative electrode current collector.

* * * * *